H. V. WILLE.
STAY BOLT.
APPLICATION FILED SEPT. 4, 1914.
1,154,469. Patented Sept. 21, 1915.
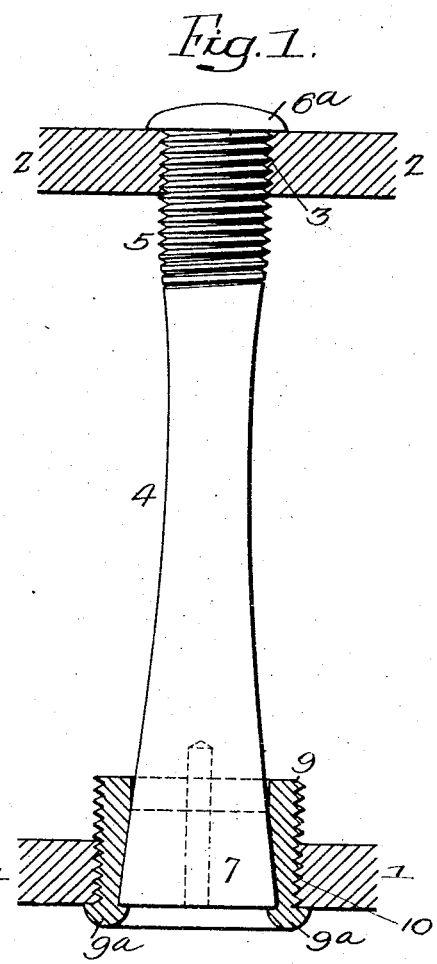
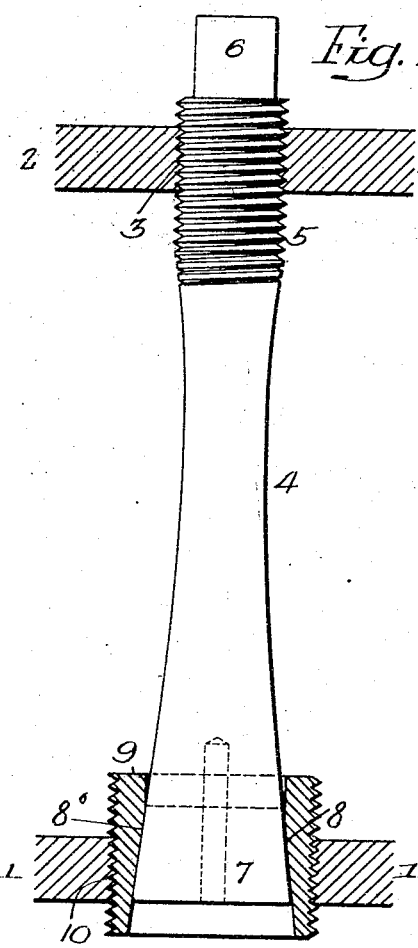
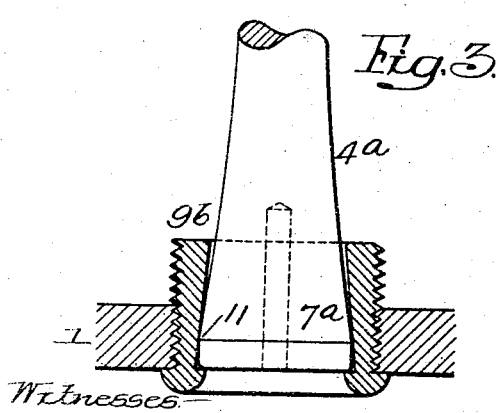
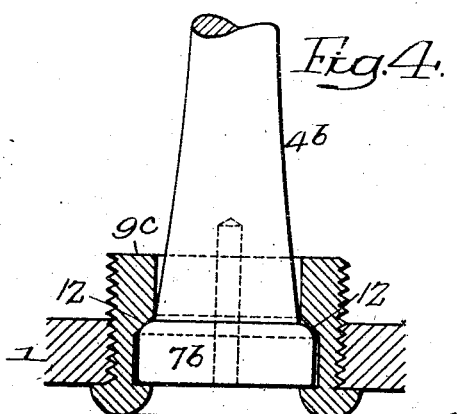
Witnesses
Will A. Burrows
Walter Chism
Inventor
Henry V. Wille.
by his Attorneys
Howson & Howson

UNITED STATES PATENT OFFICE.

HENRY V. WILLE, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

STAY-BOLT.

1,154,469.  Specification of Letters Patent.  Patented Sept. 21, 1915.

Application filed September 4, 1914. Serial No. 860,215.

*To all whom it may concern:*

Be it known that I, HENRY V. WILLE, a citizen of the United States, residing in Philadelphia, Pennsylvania, have invented certain Improvements in Stay-Bolts, of which the following is a specification.

My invention relates to certain improvements in stay bolts for securing the inner and the outer sheets of a boiler together, especially a locomotive boiler.

One object of the invention is to design a semi-flexible stay bolt so that it can be readily secured to the inner sheet of a boiler and so coupled to the outer sheet that the bolt can have a certain amount of movement at the joint to allow for the expansion and contraction of the inner sheet; the joint between the last mentioned sheet and the stay bolt being steam tight.

A further object of the invention is to construct the bolt so that it will be held against the seat in order that the joint may be steam tight, yet it will be so designed that the bending movement will be at the seat where the bolt rests against the outer seat.

Where a screw thread bolt is used, the bending of the bolt at the outer sheet is liable to form a fracture at the thread and this is the case when the bolts are made of steel. The universal practice now is to make the bolts of iron, but by my invention they may be made either of iron or of steel and the bolt will not fracture at the outer plate.

In the accompanying drawing:—Figure 1, is a view of the completed stay bolt securing the two plates of a boiler; Fig. 2, is a view of the stay bolt prior to being headed and the bushing headed; and Figs. 3 and 4, are views illustrating other forms of the stay bolt.

Referring to the drawing, 1 is the outer plate of a boiler and 2 is the inner plate having a threaded opening 3.

4 is a stay bolt, shaped as shown in Figs. 1 and 2, so that it will have an approximately uniform bending moment in flexure. At one end of the stay bolt is a threaded section 5 and beyond this is a head 6, which is removed after the stay bolt has been located in position, so that the head $6^a$ can be formed on the bolt, as in Fig. 1, in order to make it steam tight against the plate 2. The other end 7 of the bolt is tapered, as indicated in Figs. 1 and 2, and this end is adapted to a tapered seat 8 in a bushing 9 having an external thread which is adapted to the threaded opening 10 in the plate 1. The parts are so proportioned that the end of the stay bolt will terminate short of the end of the bushing, so that the bushing can be beaded over the stay bolt, forming a rib, as at $9^a$, Fig. 1; the rib also extending over the outer edge of the plate 1, forming a steam tight joint between the bushing and the head of the stay bolt. This joint is more flexible than where the stay bolt is screwed into the sheet and riveted over, as is now universally done, and yet it is much simpler than the flexible stay bolt in which there is a ball and socket and numerous parts.

In Fig. 3, I have illustrated a modification in which the taper of the end $7^a$ of the bolt $4^a$ is at a different angle from the taper of the bushing $9^b$, forming an inner edge as at 11, and making a steam tight line joint.

In Fig. 4, I have shown the bushing $9^c$ as having a shoulder 12 to receive a head $7^b$ on the end of the stay bolt $4^b$. The bearing of the head is slightly rounded and fits against the beveled seat or shoulder 12. The projecting end of the bushing, both in Figs. 3 and 4, is turned over the end of the stay bolt and over the sheet, as in Fig. 1.

I claim:—

1. The combination of a stay bolt having a threaded portion at one end and a seat portion at the opposite end; two plates, one having a threaded opening to receive the threaded portion of the plate, the other having a large threaded opening; and a bushing mounted in the threaded opening and having a seat for the seat portion of the bolt, the bushing extending beyond the plate and beyond the bolt and flanged over the bolt to hold said bolt to its seat.

2. The combination of a stay bolt having a threaded portion at one end and a beveled seat portion at the opposite end; two plates, one having a threaded opening to receive the threaded portion of the bolt, the other having a large threaded opening; and a bushing mounted in the threaded opening and having a beveled seat for the seat portion of the bolt, the bushing extending beyond the end of the bolt and beyond the plate and flanged over the bolt and plate, holding the bolt to its seat.

3. The combination of an inner and an outer plate of a boiler, the inner plate having a threaded opening; a bushing in the outer plate having a tapered seat; with a stay bolt having a thread at one end adapted to the threaded opening of the inner plate; and a tapered head adapted to the tapered seat of the bushing, the bushing being beaded over the head, holding the head in steam tight contact with its seat.

In testimony whereof, I have signed my name to this specification, in the presence of two subscribing witnesses.

HENRY V. WILLE.

Witnesses:
Jos. H. KLEIN,
WM. A. BARR.

Copies of this patent may be obtained for five cents each, by addressing the "Commissioner of Patents, Washington, D. C."